(12) United States Patent
Sato

(10) Patent No.: US 6,757,133 B1
(45) Date of Patent: Jun. 29, 2004

(54) THIN FILM MAGNETIC HEAD

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/478,175

(22) Filed: Jan. 5, 2000

(30) Foreign Application Priority Data

Jan. 13, 1999 (JP) ............................................. 11-006473

(51) Int. Cl.⁷ ............................................... G11B 5/147
(52) U.S. Cl. ........................................ 360/126; 360/317
(58) Field of Search ................................ 360/125–126, 360/317

(56) References Cited

U.S. PATENT DOCUMENTS

| 5,486,968 | A | | 1/1996 | Lee et al. | |
|---|---|---|---|---|---|
| 5,691,867 | A | * | 11/1997 | Onuma et al. | 360/126 |
| 5,701,221 | A | * | 12/1997 | Taniyama et al. | 360/327.3 |
| 5,751,522 | A | | 5/1998 | Yamada et al. | |
| 5,835,313 | A | * | 11/1998 | Sato et al. | 360/317 |
| 5,896,254 | A | | 4/1999 | Sato et al. | |
| 6,134,080 | A | * | 10/2000 | Chang et al. | 360/126 |
| 6,163,436 | A | * | 12/2000 | Sasaki et al. | 360/126 |
| 6,191,918 | B1 | * | 2/2001 | Clarke et al. | 360/126 |
| 6,198,597 | B1 | * | 3/2001 | Tateyama et al. | 360/126 |
| 6,285,532 | B1 | * | 9/2001 | Sasaki | 360/317 |
| 6,317,288 | B1 | * | 11/2001 | Sasaki | 360/126 |
| 6,524,491 | B1 | * | 2/2003 | Liu et al. | 216/22 |

FOREIGN PATENT DOCUMENTS

| JP | 58-17521 | 2/1983 |
|---|---|---|
| JP | 1-144205 | 6/1989 |
| JP | 4-103008 | 4/1992 |
| JP | 7-21524 | 1/1995 |
| JP | 8-279108 | 10/1996 |
| JP | 9-198624 | 7/1997 |
| JP | 10-83519 | 3/1998 |

* cited by examiner

Primary Examiner—A. J. Heinz
(74) Attorney, Agent, or Firm—Brinks Hofer Gilson & Lione

(57) ABSTRACT

A thin film magnetic head includes a magnetic lower core layer, a magnetic upper core layer, a coil layer, for inducing a recording magnetic field in the lower core layer and the upper core layer, formed so as to go around the base of the upper core layer, and a planarizing layer formed in the periphery of the lower core layer, excluding the section exposed to the air bearing surface, so that the surface of the planarizing layer is level with the surface of the lower core layer, the coil layer being formed from on the lower core layer to on the planarizing layer. A method of producing a thin film magnetic head is also disclosed.

10 Claims, 6 Drawing Sheets

THIN FILM MAGNETIC HEAD

BACKGROUND OF THE INVENTION

1. Field of the Invention

The present invention relates to a thin film magnetic head including an inductive head for writing, or a combined thin film magnetic head in which an inductive head for writing and a magnetoresistive (MR) head for reading are laminated. More particularly, the invention relates to a thin film magnetic head in which a coil layer can be properly formed and inductance can be reduced at the same time.

2. Description of the Related Art

FIG. 10 is a longitudinal sectional view of a conventional thin film magnetic head, and the left end of the thin film magnetic head in the drawing corresponds to an air bearing surface (ABS).

This thin film magnetic head is provided on the trailing edge of a slider of a floating-type magnetic head which faces a recording medium such as a hard disk, and is a combined thin film magnetic head including an MR head which uses magnetoresistance for reading and an inductive head for writing.

A lower shielding layer 1 is composed of a magnetic material such as an NiFe alloy (permalloy), and a lower gap layer 2 is formed on the lower shielding layer 1. A magnetoresistive element 3 is formed on the lower gap layer 2. The magnetoresistive element 3 includes a multilayer film 4 composed of a spin-valve element (one type of GMR element) or the like that exhibits magnetoresistance, a pair of hard bias layers (not shown in the drawing) formed on both sides of the multilayer film 4, and an electrode layer (not shown in the drawing) for applying a sensing current to the multilayer film 4.

An upper shielding layer 8 composed of a magnetic material such as an NiFe alloy is further formed on the magnetoresistive element 3 with a nonmagnetic upper gap layer 7 therebetween. As described above, the thin film magnetic head shown in FIG. 10 is a combined thin film magnetic head in which an MR head and an inductive head are laminated, and the upper shielding layer 8 also serves as a lower core layer for the inductive head. Hereinafter, the layer represented by numeral 8 is referred to as a lower core layer.

A gap layer 10 composed of a nonmagnetic material, such as $Al_2O_3$ (alumina) or $SiO_2$, is formed on the lower core layer 8. An insulating layer 11 composed of a resist material or other organic materials is further formed on the gap layer 10.

A coil layer 12, composed of a conductive material having low electrical resistance, such as Cu, is spirally formed on the insulating layer 11. The coil layer 12 is formed so as to go around a base 15b of an upper core layer 15, which will be described below.

As shown in FIG. 10, the coil layer 12 is covered by an insulating layer 14 composed of an organic material or the like. A hole is made in the gap layer 10 and the insulating layer 14 formed on the lower core layer 8, and the base 15b of the upper core layer 15 is formed through the hole, thus magnetically coupling the upper core layer 15 and the lower core layer 8.

The upper core layer 15 is formed on the insulating layer 14 in the direction of the ABS (toward the left in the drawing), and a tip 15a of the upper core layer 15 is joined to the lower core layer 8 with the gap layer 10 therebetween at the section facing a recording medium to form a magnetic gap having a gap length Gl.

As shown in FIG. 10, above a coil center 12a of the coil layer 12, which is formed at the rear of the lower core layer 8 (on the right side in the drawing), a hole is made in the insulating layer 14, and a coil lead layer 18 is formed on the coil center 12a through the hole.

For example, the coil lead layer 18 is composed of the same material as that for the upper core layer 15, and is formed simultaneously with the upper core layer 15.

In the inductive head for writing, when a recording current is applied to the coil layer 12, a recording magnetic field is induced in the lower core layer 8 and the upper core layer 15, and a magnetic signal is recorded onto a recording medium such as a hard disk by means of a leakage magnetic field from the magnetic gap between the lower core layer 8 and the tip 15a of the upper core layer 15.

However, in the structure of the thin film magnetic head shown in FIG. 10, a sharp step is produced at the rear of the lower core layer 8 (on the right side in the drawing), and the coil layer 12 must be formed on the insulating layer 11 having the step. If the width of the lower core layer 8 (in the track width direction; perpendicularly with respect to the drawing) is smaller than the width of the coil layer 12, a portion of the coil layer 12 in the width direction must be formed on the insulating layer 11 having the step beneath which the lower core layer 8 is not formed.

That is, in the thin film magnetic head shown in FIG. 10, since the lower core layer 8 is not formed entirely beneath the insulating layer 11 on which the coil layer 12 is to be formed, the coil layer 12 extending beyond the lower core layer 8 must be formed on the insulating layer 11 having the step. When the coil layer 12 is formed on such an insulating layer 11 having the step, it is not possible to pattern the coil layer 12 in a proper shape due to inconsistent focus when a resist layer is exposed during the formation of the coil layer 12.

Additionally, by increasing the pitch of the coil layer 12, patterning of the coil layer 12 can be performed properly to a certain extent. However, if the pitch of the coil layer 12 is increased, the length of the upper core layer 15 form the tip 15a to the base 15b must be increased, and thereby the length of a magnetic path made from the upper core layer 15 through the lower core layer 8 is increased, resulting in an increase in inductance.

FIG. 11 is a partial perspective view of a thin film magnetic head which is improved in order to overcome the problems described above, and FIG. 12 is a longitudinal sectional view of the thin film magnetic head shown in FIG. 11.

As shown in FIG. 11, a lower core layer 16 is formed larger than a coil layer 12. Thus, there is no step in an insulating layer 11 in the region in which the coil layer 12 is to be formed (refer to FIG. 12), and the coil layer 12 can be accurately patterned on a planarized surface (the insulating layer 11).

However, as shown in FIG. 11, if the size of the lower core layer 16 is increased, inductance increases, and in particular, in the coming age of high frequency and high recording density, there is a growing need for a reduction of inductance.

As shown in FIG. 12, the lower core layer 16 has a step 16a, following the steps in the individual layers formed thereunder, and it is not possible to form the coil layer 12 on a completely planarized surface (insulating layer 11). When there is such a step 16a, the pitch of the coil layer 12 must be increased so that the patterning accuracy in the formation of the coil layer 12 is improved, and in accordance with the increase in the pitch of the coil layer 12, the length of an upper core layer 15 must be increased, and thus the length of the magnetic path is increased, resulting in a further increase in inductance.

As described above, in the conventional thin film magnetic heads, the formation of a coil layer on a planarized surface without a step and a reduction in inductance are incompatible.

SUMMARY OF THE INVENTION

The present invention has been achieved to overcome the disadvantages associated with the conventional thin film magnetic heads. It is an object of the present invention to provide a thin film magnetic head in which a planarizing layer is formed in the periphery of a lower core layer so that a coil layer is formed properly and inductance is reduced at the same time, and to provide a method of producing the same.

In accordance with the present invention, a thin film magnetic head includes a lower core layer composed of a magnetic material; an upper core layer composed of a magnetic material, a base of the upper core layer being magnetically coupled to the lower core layer, and a tip of the upper core layer facing the lower core layer with a nonmagnetic gap layer therebetween at a section exposed to the air bearing surface; a coil layer, for inducing a recording magnetic field in the lower core layer and the upper core layer, formed so as to go around the base of the upper core layer; and a planarizing layer formed in the periphery of the lower core layer, excluding the section exposed to the air bearing surface, so that the surface of the planarizing layer is level with the surface of the lower core layer, the coil layer being formed on the lower core layer and on the planarizing layer.

Preferably, in accordance with the present invention, the back end of the lower core layer extends to the position in which the base of the upper core layer is magnetically coupled to the lower core layer, and the planarizing layer is formed at the rear of the back end of the lower core layer.

Preferably, in accordance with the present invention, the thin film magnetic head further includes a lower shielding layer, a lower gap layer, a magnetoresistive element including a multilayer film exhibiting magnetoresistance and an electrode layer for applying a sensing current to the multilayer film, and an upper gap layer deposited in that order from the bottom, and the lower core layer is formed thereon, in which the peripheral region, excluding the section exposed to the ABS of each layer from the lower shielding layer to the lower core layer, is filled with the planarizing layer.

Preferably, in accordance with the present invention, the thin film magnetic head further includes a first coil extraction layer simultaneously formed with a main electrode layer, the main electrode layer overlapping the electrode layer constituting the magnetoresistive element and formed at the rear of the electrode layer; and a second coil extraction layer composed of the same material as that for the lower core layer and simultaneously formed with the lower core layer, in which the second coil extraction layer is connected onto the first coil extraction layer, and a coil center of the coil layer is connected onto the second coil extraction layer.

Preferably, in accordance with the present invention, the thin film magnetic head further includes a first coil extraction layer simultaneously formed with a main electrode layer, the main electrode layer overlapping the electrode layer constituting the magnetoresistive element and formed at the rear of the electrode layer; and a third coil extraction layer composed of the same material as that for the lower core layer and simultaneously formed with the lower core layer, in which the third coil extraction layer is connected onto the first coil extraction layer, and a coil lead layer is formed on the third coil extraction layer.

A method of producing a thin film magnetic head in accordance with the present invention includes the steps of: depositing a lower shielding layer, a lower gap layer, a magnetoresistive element, an upper gap layer, and a lower core layer in that order on a substrate; forming a nonmagnetic insulating material layer in the periphery of the lower core layer and over the lower core layer; forming a planarizing layer in the periphery of the lower core layer by removing the surface of the nonmagnetic insulating material layer to expose the lower core layer and by planarizing the exposed surface of the lower core layer and the surface of the nonmagnetic insulating layer in the periphery thereof; forming a gap layer on the lower core layer and on the planarizing layer and further forming a coil layer on the gap layer formed on the lower core layer and on the gap layer formed on the planarizing layer; and forming an insulating layer on the coil layer and further forming an upper core layer composed of a magnetic material on the insulating layer, a base of the upper core layer being magnetically coupled to the lower core layer, a tip of the upper core layer facing the lower core layer with the gap layer therebetween at the section exposed to the air bearing surface.

Preferably, in accordance with the present invention, in the method of producing a thin film magnetic head, the magnetoresistive element is formed by depositing a multilayer film exhibiting magnetoresistance and a pair of electrode layers connected to the multilayer film, and the method further includes the steps of: forming a first coil extraction layer simultaneously with main electrode layers which overlap the electrode layers and extend at the rear of the electrode layers; and connecting a second coil extraction layer and a third coil extraction layer composed of the same material as that for the lower core layer onto the first coil extraction layer. When the coil layer is formed, the coil center is connected onto the second coil extraction layer, and a coil lead layer is further connected onto the third coil extraction layer.

In the conventional thin film magnetic heads, steps are produced in the surfaces for forming coil layers, and thus it is not possible to pattern the coil layers properly. Such steps occur because the coil layers are formed extending beyond the lower core layers formed beneath. Therefore, in order to properly pattern the coil layers, the lower core layers must be formed extending beyond the coil layers so that no step is produced in the surfaces for forming the coil layers.

However, the increased size of the lower core layers results in an increase in inductance, which makes it difficult to adapt to the coming age of high recording density and high frequency.

Therefore, in the present invention, a nonmagnetic layer (hereinafter referred to as a planarizing layer) that is level with a lower core layer is formed in the periphery of the lower core layer and is planarized at the same level as that of the lower core layer so that satisfactory patterning of a coil layer is enabled even if the size of the lower core layer is reduced.

Accordingly, even if the coil layer is formed extending beyond the lower core layer, the coil layer can be formed on a planar surface without a step because the lower core layer and the planarizing layer exist beneath the coil layer.

Furthermore, in accordance with the present invention, because of the formation of the planarizing layer, the lower core layer can be formed in a predetermined shape, and in particular, by reducing the size of the lower core layer, inductance can be decreased.

DESCRIPTION OF THE PREFERRED EMBODIMENTS

Figure 1A:
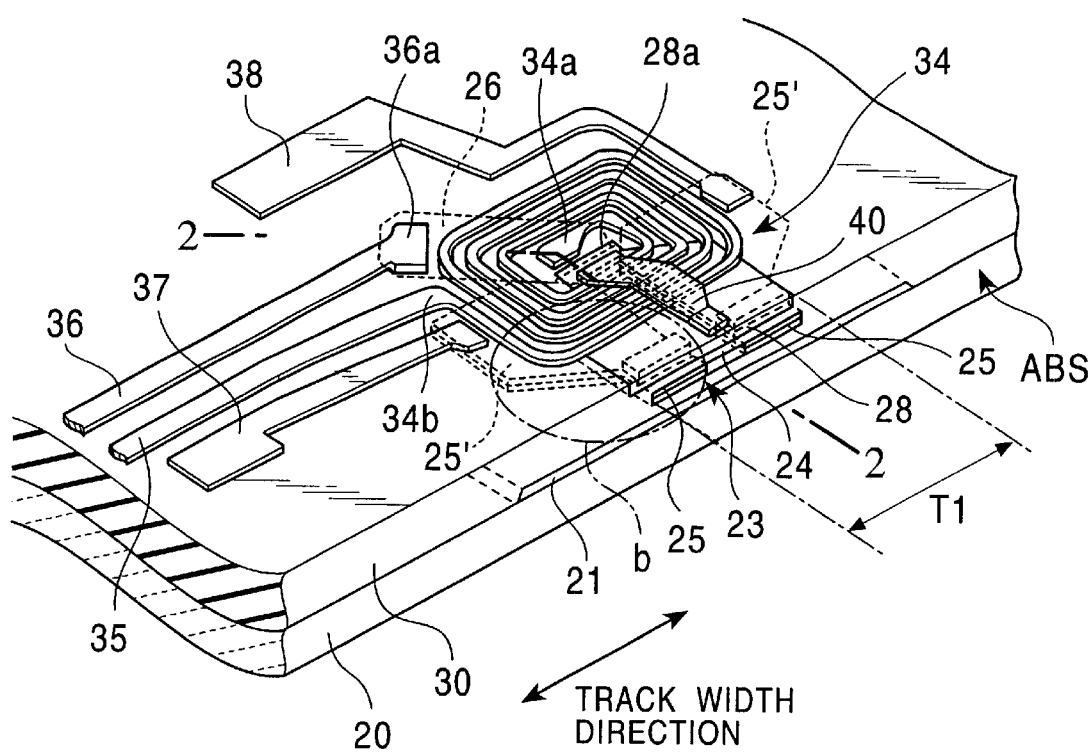
FIG. 1A is a partial perspective view which shows the structure of a thin film magnetic head as a first embodiment of the present invention and FIG. 1B is a partially enlarged view of the thin film magnetic head shown in FIG. 1A.
Figure 1B:
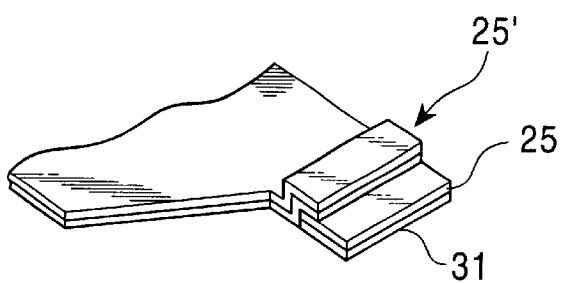
Figure 2:
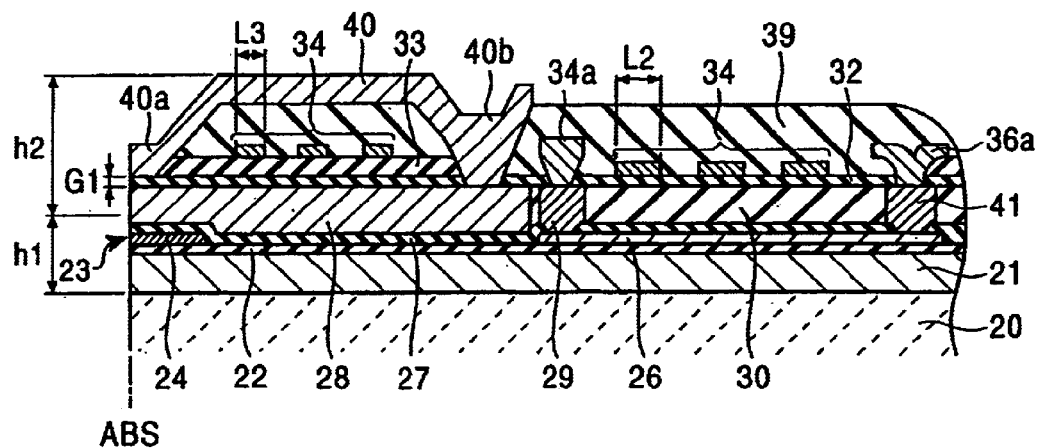
FIG. 2 is a longitudinal sectional view taken along the line 2—2 of FIG. 1A.
Figure 3:
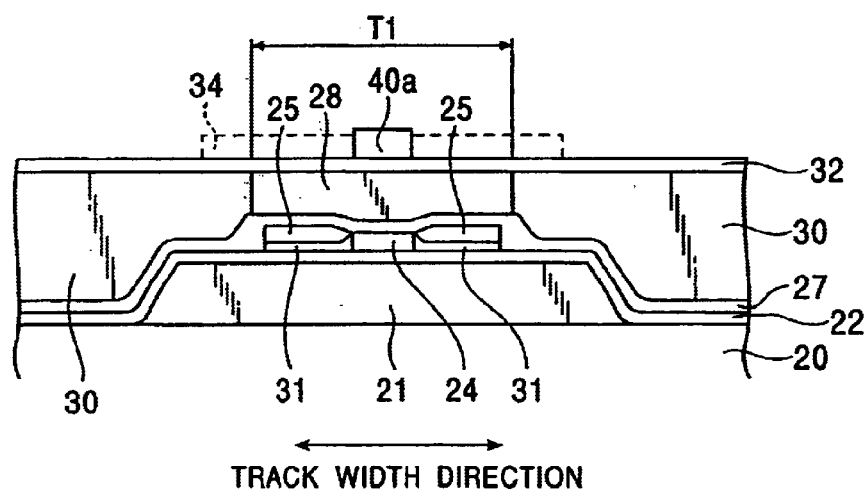
FIG. 3 is a front view of a thin film magnetic head in accordance with the present invention, viewed from an air bearing surface (ABS)

FIG. 1A is a partial perspective view of a thin film magnetic head in accordance with the present invention and FIG. 1B is a partially enlarged view of the thin film magnetic head shown in FIG. 1A. FIG. 2 is a longitudinal sectional view taken along the line 2—2 of FIG. 1A. FIG. 3 is a front view of a thin film magnetic head in accordance with the present invention, viewed from an air bearing surface (ABS).

The thin film magnetic head shown in FIG. 1 is a so-called "combined thin film magnetic head" in which a reading head (MR head) and an inductive head for writing are laminated.

Numeral 20 represents a substrate, for example, composed of alumina-titanium carbide ($Al_2O_3$—TiC). A lower shielding layer 21 composed of a magnetic material, such as an NiFe alloy, is formed on the substrate 20 with an underlying film (not shown in the drawing) composed of $Al_2O_3$ or the like therebetween. A lower gap layer 22 composed of a nonmagnetic material, such as $Al_2O_3$ or $SiO_2$, is formed on the lower shielding layer 21, and a magnetoresistive element 23 is further formed on the lower gap layer 22.

As shown in FIGS. 1 and 3, the magnetoresistive element 23 includes a multilayer film 24 exhibiting magnetoresistance, hard bias layers 31, for example, composed of a CoPt alloy or a CoCrPt alloy, formed on both sides (in the track width direction) of the multilayer film 24, and electrode layers 25 composed of a Cr film or the like for applying a sensing current to the multilayer film 24.

As shown in the partially enlarged view in FIG. 1B, a main electrode layer 25' is formed so as to partially overlap the upper surface of the electrode layer 25 and extend at the rear of the electrode layer 25. The main electrode layer 25' is a low resistance film, having a structure of Cr/Cu, Cr/Cu/Cr, or the like.

In this embodiment, a first coil extraction layer 26, which is formed simultaneously with the main electrode layer 25' and is isolated from the main electrode layer 25', is formed on the lower gap layer 22. The main electrode layer 25' and the first coil extraction layer 26 are formed, for example, by sputtering or evaporation.

As shown in FIGS. 2 and 3, an upper gap layer 27 composed of a nonmagnetic material, such as $Al_2O_3$ or $SiO_2$, is formed on the magnetoresistive element 23 and the first coil extraction layer 26, and an upper shielding layer 28 composed of an NiFe alloy or the like is further formed on the upper gap layer 27.

A laminate from the lower shielding layer 21 to the upper shielding layer 28 corresponds to an MR head h1 for reading, and as shown in FIG. 3, the lower shielding layer 21, the magnetoresistive element 23, and the upper shielding layer 28 are formed by being exposed to the surface (ABS) facing a recording medium.

When the magnetoresistive element 23 is immersed in a recording magnetic field, electrical resistance changes in response to a change in voltage of the multilayer film 24, and thus the recording magnetic field is reproduced. The shielding layers 21 and 28 sandwiching the magnetoresistive element 23 intercept noise signals from a recording medium and prevent the noise signals from entering into the magnetoresistive element 23. In order to carry out this function satisfactorily, as shown in FIG. 3, the widths of the shielding layers 21 and 28 in the track width direction are preferably equal to or greater than the width of the magnetoresistive element 23.

An inductive head for writing, which will be described below, is formed on the upper shielding layer 28, and the upper shielding layer 28 also serves as a core in the inductive head. Hereinafter, the upper shielding layer 28 is referred to as a lower core layer 28.

As shown in FIG. 2, at the rear of the lower core layer 28 (on the right side in the drawing), a second coil extraction layer 29 is formed. The second coil extraction layer 29 is formed on the first coil extraction layer 26, and the first coil extraction layer 26 and the second coil extraction layer 29 are connected to each other.

A third coil extraction layer 41 is formed on the first coil extraction layer 26 at the rear of the position in which the second coil extraction layer 29 is formed.

The second coil extraction layer 29 and the third coil extraction layer 41 are formed of the same material as that for the lower core layer 28 and simultaneously formed with the lower core layer 28. In order to form the second coil extraction layer 41 and the third coil extraction layer 41, holes having predetermined sizes are made in the upper gap layer 27 formed on the first coil extraction layer 26, and frame plating is performed through the holes simultaneously with the formation of the lower core layer 28.

As shown in FIG. 2, by forming the third coil extraction layer 41 on the first coil extraction layer 26, a hole for forming a connecting end 36a of a second coil lead layer 36 can be easily formed, and the electrical connection between the third coil extraction layer 41 and the connecting end 36a can be securely and easily performed.

In the present invention, as shown in FIGS. 1A, 1B, 2, and 3, a planarizing layer 30 is formed on the sides and at the rear of the lower core layer 28 so that the surface of the planarizing layer 30 is level with the surface of the lower core layer 28.

The planarizing layer 30 is composed of any material that is nonmagnetic and insulating, and for example, $SiO_2$, $Ta_2O_5$, $TiO$, $Al_2O_3$, $Si_3N_4$, AlN, or $WO_3$ may be used.

The planarizing layer 30 is formed by chemical-mechanical polishing (CMP), as will be described below with respect to producing steps. As shown in FIGS. 1A and 3, the planarizing layer 30 is formed entirely over the substrate 20, and the peripheries of the individual layers from the lower shielding layer 21 to the lower core layer 28, excluding the ABS, are filled with the planarizing layer 30.

As described above, in the present invention, since the planarizing layer 30 is formed so that the surface of the planarizing layer 30 is level with the surface of the lower core layer 28, the shape of the lower core layer 28 can be determined in a predetermined manner.

That is, conventionally, the shape of the lower core layer 28 has greatly influenced the patterning of the coil layer formed above the lower core layer 28. In contrast, in the present invention, by forming the planarizing layer 30, the coil layer can be patterned satisfactorily, and thus the shape of the lower core layer 28 can be determined without taking the patterning of the coil layer into consideration.

As described above, since the lower core layer 28 functions as a shielding layer in the MR head h1, it is desirable that the shape of the lower core layer 28 be determined so that the function is satisfactorily carried out and inductance is reduced.

As shown in FIG. 3, the width of the lower core layer 28 that is exposed at the ABS is set at T1. Since the lower core layer 28 functions as a shielding layer for the magnetoresistive element 23, in order to secure the shielding function, preferably, the width T1 of the lower core layer 28 is at least larger than the width of the magnetoresistive element 23.

As long as the width T1 of the lower core layer 28 that is exposed at the ABS is secured so that the shielding function is carried out satisfactorily, the lower core layer 28 formed at the rear of the ABS may be formed in any shape.

For example, in the present invention, as shown in FIG. 1, although the width of the lower core layer 28 is set at T1 from the ABS toward the back, at a back end 28a, the width is smaller than T1.

In particular, in the present invention, the back end 28a of the lower core layer 28 is preferably formed at the position in which the lower core layer 28 is brought into contact with a base 40b of the upper core layer 40, which will be described below. If the back end 28a excessively extends at the rear, there is the possibility that inductance may be increased.

As described above, in the present invention, by minimizing the shape of the lower core layer 28 while the shielding function is secured, inductance can be reduced.

A gap layer 32 composed of alumina or the like is formed on the lower core layer 28 and the planarizing layer 30. An insulating layer 33 composed of a polyimide or a resist material is further formed on the gap layer 32.

In the present invention, since the planarizing layer 30 is formed on the sides and at the rear of the lower core layer 28 so that the surface of the planarizing layer 30 is level with the surface of the lower core layer 28, the surface of the insulating layer 33, which is formed thereon with the gap layer 32 therebetween, is planarized.

A coil layer 34, which is spirally patterned, is formed on the planarized insulating layer 33. The coil layer 34 is composed of a nonmagnetic conductive material having small electrical resistance, such as copper (Cu). As shown in FIG. 1, the coil layer 34 goes around the base 40b of the upper core layer 40.

As described above, in the present invention, since the planarizing layer 30 is formed at the same level as that of the lower core layer 28 on the substrate 20, the coil layer 34 can be formed on the planarized surfaces of the lower core layer 28 and planarizing layer 30, and thus the coil layer 34 can be properly patterned.

In the present invention, as shown in FIG. 2, a coil center 34a of the coil layer 34 is electrically connected to the second coil extraction layer 29 through the gap layer 32 and the insulating layer 33.

As shown in FIG. 1, at an outer coil tap 34b of the coil layer 34, a first coil lead layer 35 is integrally formed when the coil layer 34 is formed. The first coil lead layer 35 is formed outward from the coil layer 34.

The second coil lead layer 36 is formed, using a low resistance material, such as Cu, the same as that for the coil layer 34, by plating simultaneously with the coil layer 34 and the first coil lead layer 35. As shown in FIG. 2, the connecting end 36a of the second coil lead layer 36 is formed on the third coil extraction layer 41 through the hole made in the gap layer 32, and the connecting end 36a and the third coil extraction layer 41 are electrically connected to each other.

As shown in FIG. 1, electrode lead layers 37 and 38 connected to the main electrode layers 25' which constitute the magnetoresistive element 23 are formed by plating simultaneously with the coil layer 34, the first coil lead layer 35, the second coil lead layer 36, and the third coil lead layer 41, using the same nonmagnetic conductive material, such as Cu.

As shown in FIG. 2, the coil layer 34 is surrounded by an insulating layer 39 composed of a polyimide or a resist material, and the upper core layer 40 is formed on the insulating layer 39.

As shown in FIG. 2, the base 40b of the upper core layer 40 is magnetically coupled to the lower core layer 28 through the hole made in the insulating layers 33 and 39 and the gap layer 32, and a tip 40a of the upper core layer 40 faces the lower core layer 28 with the gap layer 32 therebetween at the ABS to form a magnetic gap having a magnetic gap length Gl for applying a recording magnetic field to a recording medium.

As described above, inductance is decreased by reducing the size of the lower core layer 28 and by decreasing the length of the magnetic path formed from the lower core layer 28 through the upper core layer 40.

In order to decrease the length of the magnetic path, the pitch of the coil layer 34 formed between the tip 40a and the base 40b of the upper core layer 40 may be decreased so that the length from the tip 40a to the base 40b of the upper core layer 40 is shortened.

However, even if the pitch of the coil layer 34 formed at the rear of the base 40b of the upper core layer 40 is larger than that of the coil layer 34 formed in front of the base 40b, the length of the magnetic path is not directly influenced.

Therefore, for example, as shown in FIG. 2, preferably, a sectional width L2 of each turn of the coil layer 34 formed at the rear of the base 40b of the upper core layer 40 is formed larger than a sectional width L3 of each turn of the coil layer 34 formed in front of the base 40b so that the impedance of the coil layer 34 is decreased.

In this embodiment, the insulating layer 33, which is formed under the coil layer 34 in front of the base 40b (in the ABS direction; on the left side in the drawing), is not formed under the coil layer 34 formed at the rear of the base 40b of the upper core layer 40 (on the right side in the drawing).

Therefore, although there is a difference in level between the surface (the insulating layer 33) on which the coil layer 34 in front of the base 40b is formed and the surface (the gap layer 32) on which the coil layer 34 at the rear of the base 40b is formed, the difference does not substantially influence the patterning of the coil layer 34.

As described above, since the coil layer 34 at the rear of the base 40b of the upper core layer 40 does not influence the length of the magnetic path and there are no other restrictions, it can be formed to be slightly rough in comparison with the coil layer 34 in front of the base 40b. Thus, even if there is the difference in level in the surfaces for formation, for example, by enlarging the pitch, a decrease in the patterning accuracy can be prevented.

In the embodiment shown in FIG. 2, although the gap layer 32 is formed under the coil layer 34 at the rear of the base 40b of the upper core layer 40, the gap layer 32 may be eliminated and the coil layer 34 may be formed on the planarizing layer 30. Alternatively, as in an embodiment shown in FIG. 4, which will be described below, the insulating layer 33 may be formed under the coil layer 34 at the rear of the base 40b.

Figure 4:
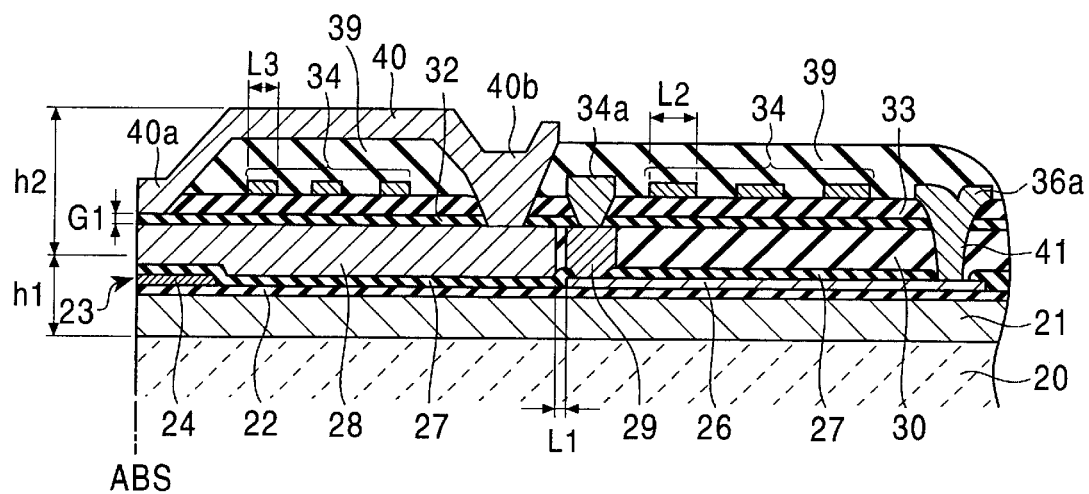
FIG. 4 is a longitudinal sectional view which shows the structure of a thin film magnetic head as a second embodiment of the present invention.

FIG. 4 is a longitudinal sectional view which shows the structure of a thin film magnetic head as a second embodiment of the present invention.

In this embodiment, a connecting end 36a of a second coil lead layer 36 is electrically connected to a first coil extraction layer 26 through a hole made in an upper gap layer 27, a planarizing layer 30, a gap layer 32, and an insulating layer 33.

However, it is preferable that a third coil extraction layer 41 be formed as in the first embodiment shown in FIG. 2.

When the connecting end 36a of the second coil lead layer 36 is formed directly on the first coil extraction layer 26 as in the second embodiment shown in FIG. 4, since the upper gap layer 27, the planarizing layer 30, the gap layer 32, and the insulating layer 33 are formed on the first coil extraction layer 26, the total film thickness of the layers is increased, and thus it is considered to be difficult to make a hole for forming the connecting end 36a from the insulating layer 33 to the first coil extraction layer 26.

In the second embodiment, the insulating layer 33 is formed under the coil layer at the rear of the base 40b of the upper core layer 40 (on the right side in the drawing), and the coil layer 34 in front of the base 40b is level with the coil layer 34 at the rear of the base 40b.

As described above, by decreasing a sectional width L3 of the coil layer 34 formed in front of the base 40b of the upper core layer 40 and by decreasing the pitch of the coil layer 34 to shorten the length of the upper core layer 40, the magnetic path from the upper core layer 40 through the lower core layer 28 can be shortened, resulting in a decrease in inductance.

On the other hand, since the coil layer 34 at the rear of the base 40b of the upper core layer 40 does not influence the length of the magnetic path and there are no other restrictions, it can be formed to be slightly rough in comparison with the coil layer 34 in front of the base 40b. Thus, for example, by enlarging the pitch, a decrease in the patterning accuracy can be prevented. By increasing a sectional width L2 of the coil layer 34 at the rear of the base 40b, the impedance of the coil 34 may be decreased.

Figure 5:
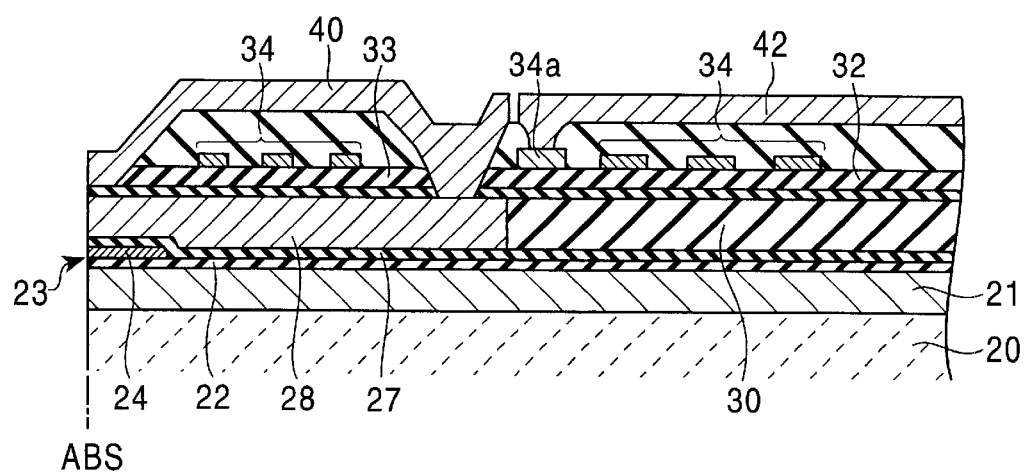
FIG. 5 is a longitudinal sectional view which shows the structure of a thin film magnetic head as a third embodiment of the present invention.

FIG. 5 is a longitudinal sectional view which shows the structure of a thin film magnetic head as a third embodiment of the present invention.

In the embodiment shown in FIG. 5, a first coil extraction layer 26 is not formed, unlike the embodiments shown in FIG. 2 and FIG. 4.

A coil lead layer 42, composed of the same material as that for an upper core layer 40 and formed simultaneously with the upper core layer 40, is formed on a coil center 34a of a coil layer 34, and a recording current flows from the coil lead layer 42 to the coil center 34a of the coil layer 34.

In the embodiments shown in FIGS. 4 and 5, a planarizing layer 30 is also formed on the sides and at the rear of a lower core layer 28, the planarizing layer 30 being level with the lower core layer 28.

Therefore, even if the size of the lower core layer 28 is reduced, the coil layer 34 to be formed on the lower core layer 28 can be formed on a planarized surface by the formation of the planarizing layer 30, and thus the coil layer 34 can be formed with high patterning accuracy.

By reducing the size of the lower core layer 28 and by decreasing the pitch of the coil layer 34 so that the length of the magnetic path formed from the upper core layer 40 through the lower core layer 28 is shortened, inductance can be reduced.

Next, a method of producing a thin film magnetic head in accordance with the present invention will be described with reference to FIGS. 6 to 9. The thin film magnetic head produced corresponds to the thin film magnetic head shown in FIG. 2.

Figure 6:
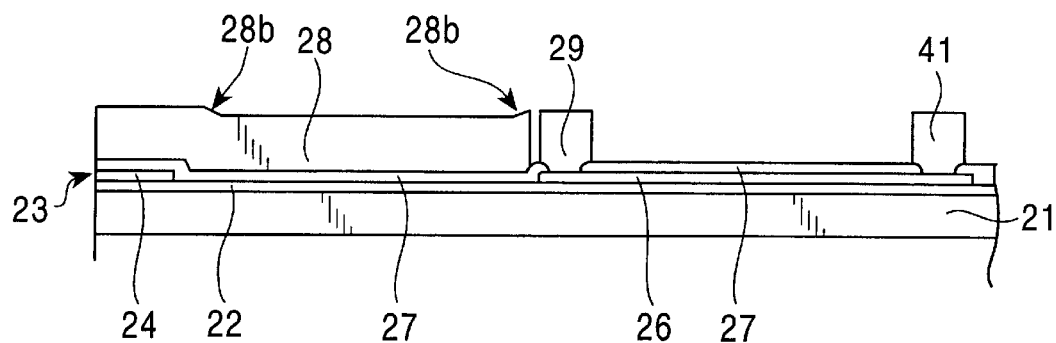
FIG. 6 is a schematic diagram which shows a step in a method of producing a thin film magnetic head in accordance with the present invention.

In a step shown in FIG. 6, a lower shielding layer 21 and a lower gap layer 22 are formed on a substrate 20, and a magnetoresistive element 23 is further formed on the lower gap layer 22. A first coil extraction layer 26 is formed on the lower gap layer 22 simultaneously with a main electrode layer 25' (refer to FIG. 1) constituting the magnetoresistive element 23.

Next, an upper gap layer 27 is formed on the magnetoresistive element 23 and the first coil extraction layer 26, and holes are made in the upper gap layer 27 formed on the predetermined position of the first coil extraction layer 26.

A lower core layer 28 is formed on the upper gap layer 27. At this stage, a second coil extraction layer 29 and a third coil extraction layer 41, composed of the same material as that for the lower core layer 28, are also formed, being isolated from the lower core layer 28, through the holes made in the upper gap layer 27. Thus, the first coil extraction layer 26 and the second coil extraction layer 29 as well as the first coil extraction layer 26 and the third coil extraction layer 41 are electrically connected to each other.

Steps 28b are formed on the surface of the lower core layer 28, following the shape of the upper gap layer 27 formed under the lower core layer 28.

Figure 7:
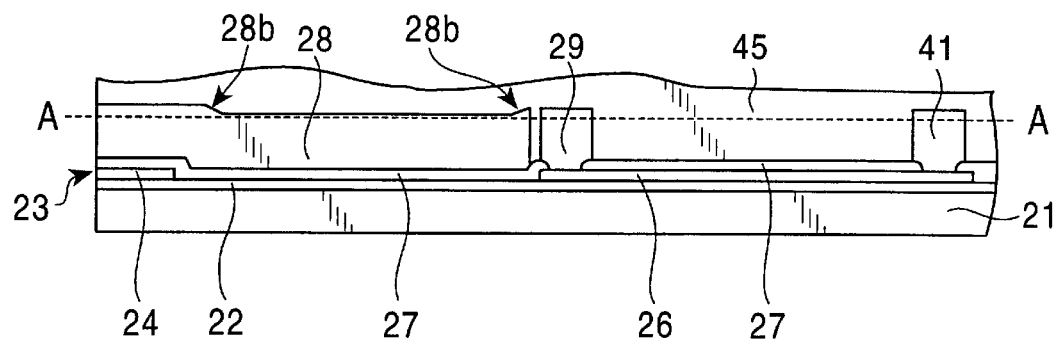
FIG. 7 is a schematic diagram which shows a step performed subsequently to the step shown in FIG. 6.

In a step shown in FIG. 7, a nonmagnetic insulating material layer 45 is formed entirely over the substrate 20 up to the thickness higher than the surface of the lower core layer 28. The substrate 20 is completely covered by the formation of the nonmagnetic insulating material layer 45. The nonmagnetic insulating material layer 45 is composed of $SiO_2$, $Ta_2O_5$, TiO, $Al_2O_3$, $Si_3N_4$, AlN, $WO_3$, or the like.

Next, the surface of the nonmagnetic insulating layer 45 is subjected to grinding by CMP. The surface of the nonmagnetic insulating layer 45 is ground, and the surfaces of the lower core layer 28, the second coil extraction layer 29, and the third coil extraction layer 41 are further ground, for example, up to the line A—A shown in FIG. 7.

Figure 8:
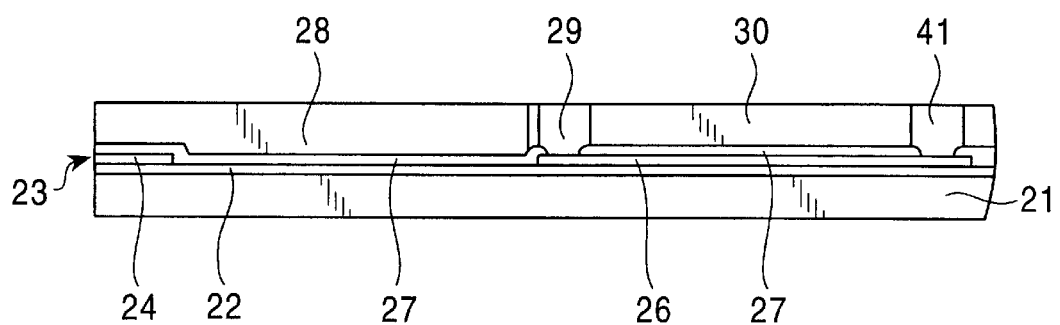
FIG. 8 is a schematic diagram which shows a step performed subsequently to the step shown in FIG. 7.

Thus, the lower core layer 28 becomes level with the nonmagnetic insulating layer 45, and the nonmagnetic insulating layer 45 remains as a planarizing layer 30 as shown in FIG. 8.

By grinding the surface of the lower core layer 28 by CMP, the steps 28b which have been formed on the surface of the lower core layer 28 are removed, and the lower core layer 28 is completely planarized.

Figure 9:
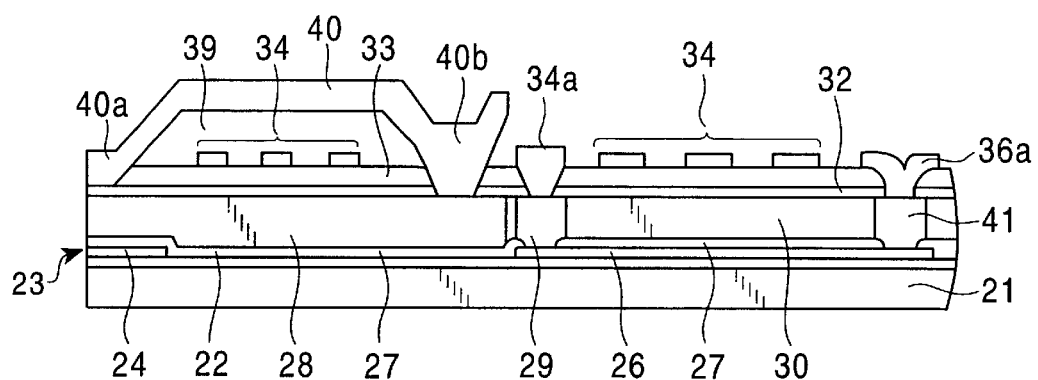
FIG. 9 is a schematic diagram which shows a step subsequently to the step shown in FIG. 8.
Figure 10:
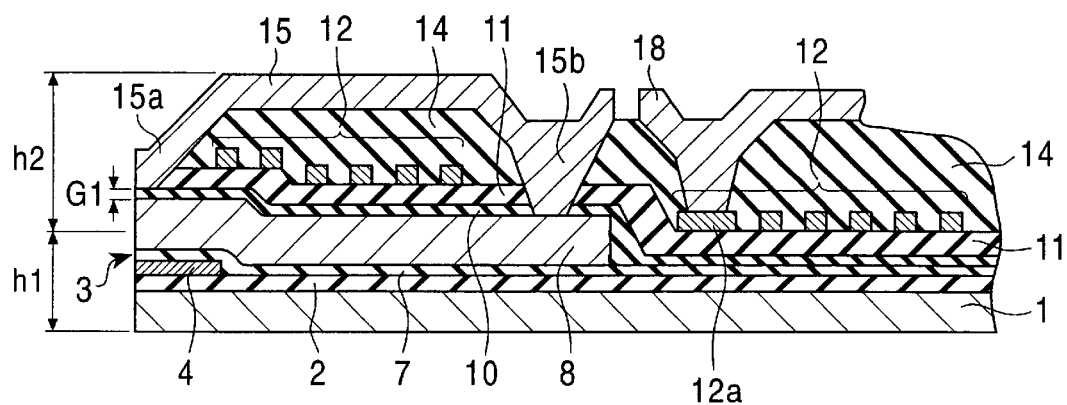
FIG. 10 is a longitudinal sectional view of a conventional thin film magnetic head.
Figure 11:
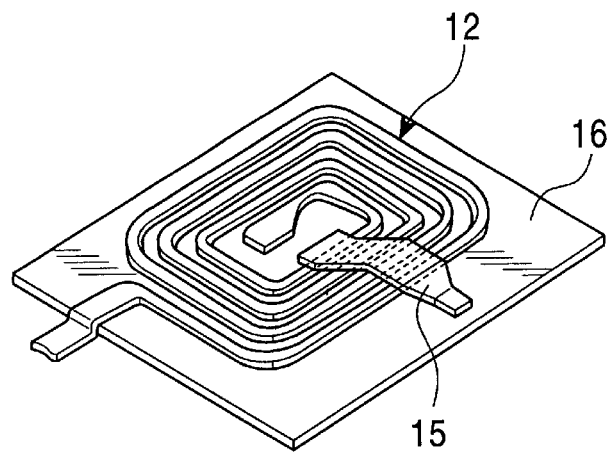
FIG. 11 is a partial perspective view of another conventional thin film magnetic head.
Figure 12:
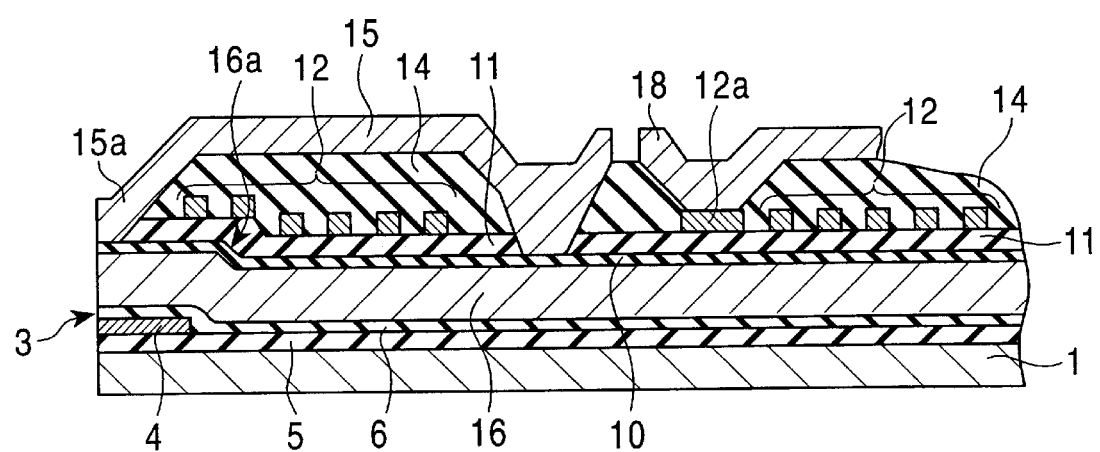
FIG. 12 is a longitudinal sectional view of the thin film magnetic head shown in FIG. 11.

In the final step shown in FIG. 9, a gap layer 32 and an insulating layer 33 are formed on the lower core layer 28 and the planarizing layer 30, and a coil layer 34 is patterned on the insulating layer 33. In the present invention, since the insulating layer 33 is planarized by the formation of the planarizing layer 30, the coil layer 34 formed on the insulating layer can be patterned with high accuracy.

When the coil layer 34 is formed, a coil center 34a of the coil layer 34 is formed on the second coil extraction layer 29 through the gap layer 32 and the insulating layer 33, and a connecting end 36a of a second coil lead layer 36 (refer to FIG. 1) is formed on the third coil extraction layer 41 through the gap layer 32 and the insulating layer 33.

An insulating layer 39 is formed on the coil layer 34, and an upper core layer 40 is further formed on the insulating layer 39. A base 40b of the upper core layer 40 is formed on the lower core layer 28, and a tip 40a is formed on the lower core layer 28 with the gap layer 32 therebetween at the ABS.

As described in the step shown in FIG. 8, in the present invention, the steps 28b formed on the lower core layer 28 are also removed by CMP, and the lower core layer 28 is completely planarized. Therefore, the gap layer 32 formed on the lower core layer 28 is also planarized, and as shown in the front view in FIG. 3, deformation and the like do not occur in the gap layer 32 between the lower core layer 28 and the tip 40a of the upper core layer 40.

In lower core layers of the conventional magnetic thin film heads, steps are formed on the surfaces thereof due to the steps formed in the individual layers underneath, and since gap layers are formed on the lower core layers having such steps, deformation and the like occur in the gap layers between the lower core layers and the upper core layers. Such deformation in the gap layers result in degradation in recording characteristics. However, in the present invention, since no deformation occurs in the gap layer 32, it is possible to improve recording characteristics in comparison with the conventional magnetic thin film heads.

Although the thin film magnetic heads shown in FIGS. 1A and 1B to FIG. 5 are so-called "combined thin film magnetic heads" including MR heads h1 and inductive heads h2, the present invention is also applicable to a thin film magnetic head including an inductive head h2 only.

As described above, in accordance with the present invention, since a planarizing layer is formed in the periphery of a lower core layer, excluding the ABS, at the same level as that of the lower core layer, the surface on which a coil layer is to be formed is planarized, and thus the patterning of the coil layer can be improved.

Moreover, in accordance with the present invention, by the formation of the planarizing layer, the lower core layer can be formed in a predetermined shape.

That is, in the present invention, the size of the lower core layer can be reduced, and by decreasing the pitch of the coil layer so that the length of an upper core layer is decreased and the length of the magnetic path formed from the upper core layer through the lower core layer is shortened, inductance can be further reduced.

What is claimed is:

1. A thin film magnetic head comprising:
   a lower core layer comprising a magnetic material;
   an upper core layer comprising a magnetic material, a base of the upper core layer being magnetically coupled to the lower core layer, a tip of the upper core layer facing the lower core layer with a nonmagnetic gap layer therebetween at a section exposed to an air bearing surface (ABS);
   a coil layer, for inducing a recording magnetic field in the lower core layer and the upper core layer, formed so as to go around the base of the upper core layer;
   a planarizing layer formed in a periphery of the lower core layer, excluding a section exposed to the air bearing surface, so that a surface of the planarizing layer is level with a surface of the lower core layer, the coil layer being formed over the lower core layer and the planarizing layer; and
   a lower shielding layer, a lower gap layer, a magnetoresistive element comprising a multilayer film exhibiting magnetoresistance and an electrode layer for applying a sensing current to the multilayer film, and an upper gap layer, deposited in that order from the bottom,
   wherein the lower core layer is formed thereon, and a periphery of each layer from the lower shielding layer to the lower core layer, excluding the section exposed to the ABS, is filled with the planarizing layer.

2. A thin film magnetic head according to claim 1, wherein a back end of the lower core layer extends to a position in which the base of the upper core layer is magnetically coupled to the lower core layer, and the planarizing layer is formed at a rear of the back end of the lower core layer.

3. A thin film magnetic head according to claim 1, further comprising a first coil extraction layer simultaneously formed with a main electrode layer, the main electrode layer overlapping the electrode layer constituting the magnetoresistive element and formed at a rear of the electrode layer, and a third coil extraction layer comprising the same material as that for the lower core layer and simultaneously formed with the lower core layer,
   wherein the third coil extraction layer is connected onto the first coil extraction layer, and a coil lead layer is formed on the third coil extraction layer.

4. A thin film magnetic head according to claim 1, further comprising a first coil extraction layer simultaneously formed with a main electrode layer, a main electrode layer overlapping the electrode layer constituting the magnetoresistive element and formed at a rear of the electrode layer, and a second coil extraction layer comprising the same material as that for the lower core layer and simultaneously formed with the lower core layer,
   wherein the second coil extraction layer is connected onto the first coil extraction layer, and a coil center of the coil layer is connected onto the second coil extraction layer.

5. A thin film magnetic head comprising:
   a lower core layer comprising a magnetic material;

an upper core layer comprising a magnetic material, a base of the upper core layer being magnetically coupled to the lower core layer, a tip of the upper core layer facing the lower core layer with a nonmagnetic gap layer therebetween at a section exposed to an air bearing surface (ABS);

a coil layer, for inducing a recording magnetic field in the lower core layer and the upper core layer, formed so as to go around the base of the upper core layer;

a planarizing layer formed in a periphery of the lower core layer, excluding a section exposed to the air bearing surface, so that a surface of the planarizing layer is level with a surface of the lower core layer, the coil layer being formed over the lower core layer and the planarizing layer, wherein the surface of the lower core layer is planarized, and the planarizing layer composed of a nonmagnetic insulating material is formed in the periphery of the lower core layer and on a lower shielding layer, excluding the section exposed to the air bearing surface;

a first coil extraction layer is formed below the planarizing layer, the first coil extraction layer being insulated, and a second coil extraction layer and a third coil extraction layer formed so as to be surrounded by the planarizing layer and so that surfaces of the second coil extraction layer and the third coil extraction layer are level with the surface of the planarizing layer, each of the second coil extraction layer and the third coil extraction layer being connected to the first coil extraction layer, wherein the coil layer is formed on the lower core layer and the planarizing layer, and a coil center of the coil layer is placed on and connected to the second coil extraction layer; and a first coil lead layer is formed on the planarizing layer, the first coil lead layer being integrally formed with the coil layer and extending from an outer coil tap of the coil layer, a second coil lead layer is formed on the planarizing layer outside a region in which the coil layer is formed, and an end of the second coil lead layer is placed on and connected to the third coil extraction layer.

6. A thin film magnetic head according to claim 5, further comprising a lower gap layer, a magnetoresistive element comprising a multilayer film exhibiting magnetoresistance and an electrode layer for applying a sensing current to the multilayer film, and an upper gap layer, deposited in that order from the lower shielding layer, wherein the lower core layer is formed thereon, and the periphery, excluding the section exposed to the ABS, of each layer from the lower shielding layer to the lower core layer, is filled with the planarizing layer.

7. A thin film magnetic head according to claim 5, wherein the second coil extraction layer and the third coil extraction layer comprise the same material as that for the lower core layer and are simultaneously formed with the lower core layer.

8. A thin film magnetic head according to claim 5, further comprising an electrode layer and a main electrode layer, the main electrode layer overlapping an electrode layer constituting a magnetoresistive element and formed at a rear of the electrode layer, the electrode layer and the main electrode layer being disposed below the planarizing layer, wherein the main electrode layer comprises the same material as that for the first coil extraction layer and is simultaneously formed with the first coil extraction layer.

9. A thin film magnetic head according to claim 5, further comprising a main electrode layer overlapping an electrode layer constituting a magnetoresistive element and formed at a rear of the electrode layer, a first coil extraction layer simultaneously formed with a main electrode layer, and the second coil extraction layer comprising the same material as that for the lower core layer and simultaneously formed with the lower core layer, wherein a coil center of the coil layer is connected onto the second coil extraction layer.

10. A thin film magnetic head according to claim 5, further comprising a main electrode layer overlapping an electrode layer constituting the magnetoresistive element and formed at a rear of the electrode layer, the first coil extraction layer simultaneously formed with a main electrode layer, and the third coil extraction layer comprising the same material as that for the lower core layer and simultaneously formed with the lower core layer, wherein a coil lead layer is formed on the third coil extraction layer.

* * * * *